US006926174B1

(12) United States Patent
Heldt

(10) Patent No.: US 6,926,174 B1
(45) Date of Patent: Aug. 9, 2005

(54) SAFETY CAP

(75) Inventor: Frédéric Heldt, Louviers (FR)

(73) Assignee: Valois SAS, Le Neuborg (FR)

( * ) Notice: Subject to any disclaimer, the term of this patent is extended or adjusted under 35 U.S.C. 154(b) by 105 days.

(21) Appl. No.: 10/148,231

(22) PCT Filed: Nov. 23, 2000

(86) PCT No.: PCT/FR00/03266

§ 371 (c)(1),
(2), (4) Date: Nov. 21, 2002

(87) PCT Pub. No.: WO01/40069

PCT Pub. Date: Jun. 7, 2001

(30) Foreign Application Priority Data

Nov. 29, 1999 (FR) .................................. 99 15441

(51) Int. Cl.[7] .............................................. G01F 11/42
(52) U.S. Cl. .............................. 222/321.7; 222/153.1; 222/153.14; 222/182; 215/321; 220/300
(58) Field of Search ................................ 222/562, 546, 222/321.6, 321.7, 153.01, 153.1, 153.14, 222/153.12; 220/297, 300, 301–302, 293–294, 220/281; 215/332, 318, 321, 317

(56) References Cited

U.S. PATENT DOCUMENTS 3,235,132 A * 2/1966 Patton et al. ............... 222/182
3,595,427 A * 7/1971 Markowitz .................. 220/288
3,768,703 A * 10/1973 Markowitz .................. 222/182
3,804,301 A * 4/1974 Treanor ................... 222/153.1
3,934,751 A * 1/1976 Green et al. ................ 220/784
4,116,351 A * 9/1978 Uhlig ......................... 215/216
4,204,615 A * 5/1980 McCarthy ............. 222/153.14
4,279,355 A * 7/1981 Schwartz et al. ........... 220/300
4,331,247 A * 5/1982 Mumford .................... 215/216
4,353,483 A * 10/1982 Pehr ...................... 222/153.02
4,420,099 A * 12/1983 Pizzurro et al. ............ 222/205
4,627,547 A * 12/1986 Cooke ........................ 215/222
4,630,743 A * 12/1986 Wright ....................... 215/216
5,279,434 A * 1/1994 Aguirrezabal ............... 215/331
5,462,182 A * 10/1995 Opresco ..................... 215/216
5,749,491 A * 5/1998 Wylder et al. .............. 220/719

* cited by examiner

*Primary Examiner*—Frederick C. Nicolas
(74) *Attorney, Agent, or Firm*—Sughrue Mion, PLLC

(57) ABSTRACT

A fluid dispenser device (10) including a fluid reservoir, a dispensing member such as a pump, a dispensing head (15) provided with a dispensing orifice (16) and with a fixing portion (12, 13), and a safety cap (20) provided with fixing device (30) for fixing the cap (20) to the dispenser device (10), the fixing device (30) being removable in order to take off the cap (20) before the dispenser device (10) is used, the fixing device (30) being removed by a combination of axial pressure on the cap (30) along an axis (X) of the device, and turning the cap (20) about the axis (X), the fluid dispenser device being characterized in that the cap (20) is provided with fixing tabs (31), each of which has a U-shaped end (32), and the fixing portion (12, 13) is provided with a respective axial slot (12) for the U-shaped end (32) of each fixing tab (31), the axial slot (12) being defined by a respective side wall (13) adapted to come into position between the branches of the U-shaped end (32), after the cap (20) has been turned.

19 Claims, 1 Drawing Sheet

SAFETY CAP

The present invention relates to a fluid dispenser device incorporating a safety cap. More particularly, the present invention relates to a safety cap for a spray device of the nasal spray type.

In the field of fluid dispensers, in particular for dispensing pharmaceuticals, it can be necessary to avoid unwanted actuating of the device by certain people, such as children. The fluid contained in the dispenser device can be very dangerous for a child, if the child actuates the dispenser accidentally.

Documents U.S. Pat. No. 3,768,703, U.S. Pat. No. 3,866,802, and FR-2 750 406 disclose various types of cap for fluid dispenser devices. In particular Document U.S. Pat. No. 3,768,703 discloses a safety cap provided with a bayonet-type fixing system.

An object of the present invention is to provide a fluid dispenser having a safety cap for preventing the device from being actuated by a child that is simpler and less costly to manufacture. A particular object of the present invention is to provide a safety cap that can be used on nasal spray devices of the monospray type, i.e. that contain a single metered quantity of fluid to be dispensed. In which case, the cost of the dispenser device is a major factor so that a simple and inexpensive system is desirable.

The present invention provides a fluid dispenser device comprising a fluid reservoir, a dispensing member such as a pump, a dispensing head provided with a dispensing orifice and with a fixing portion, and a safety cap provided with fixing means for fixing said cap to said dispenser device, said fixing means being removable in order to take off said cap before said dispenser device is used, said fixing means being removed by a combination of axial pressure on said cap along an axis of said device, and of turning said cap about said axis, said fluid dispenser device being characterized in that said cap is provided with fixing tabs, each of which has a U-shaped end, and said fixing portion is provided with a respective axial slot for said U-shaped end of each fixing tab, said axial slot being defined by a respective side wall adapted to come into position between the branches of said U-shaped end, after said cap has been turned.

Advantageously, said cap is provided with elastically-deformable means which co-operate with the dispenser device to prevent any turning of said cap in the absence of said axial pressure.

Advantageously, said cap may be turned only when said elastically-deformable means are compressed.

Advantageously, said elastically-deformable means comprise a resilient element made of a deformable flexible material, such as Santoprene, and disposed inside said cap.

Advantageously, said elastically-deformable means comprise a resilient element made of a deformable flexible material, such as Santoprene, disposed on the end wall of the cap, and extending over the inside face and over the outside face of said end wall of the cap.

Advantageously, said elastically-deformable means are compressed to enable said U-shaped end of each fixing tab to pass axially through a respective slot beyond said side wall, so that, after said cap has been turned, said elastically-deformed means urge said cap axially away from the dispensing head so that said side wall is forced elastically between said branches of the U-shaped end to fix the cap onto the head.

Other characteristics and advantages of the present invention will appear more clearly on reading the following detailed description of an advantageous embodiment of the present invention, given by way of non-limiting example and with reference to the accompanying drawings, in which.

The figures show an embodiment of the invention, in which the fluid dispenser device is a nasal spray device and therefore includes a nasal dispensing head. It is to be understood that the present invention is not limited to this type of device, but rather it applies to any fluid dispenser device.

Figure 1:
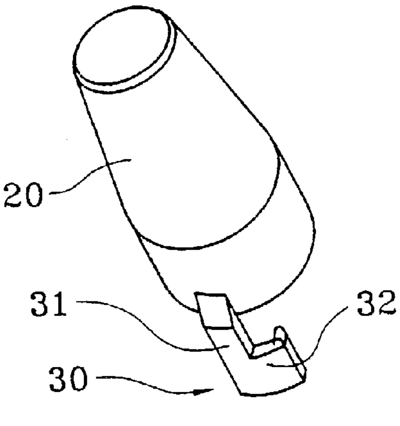
FIG. 1 is a diagrammatic perspective view of a safety cap in an embodiment of the present invention.
Figure 2:
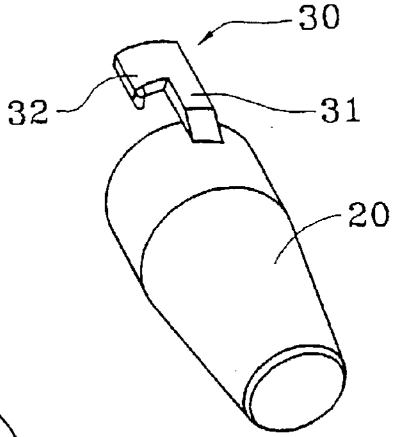
FIG. 2 is a view similar to the FIG. 1 view, seen from another angle.
Figure 3:
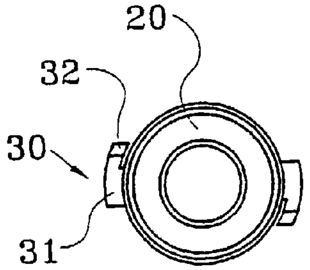
FIG. 3 is a plan view of the safety cap of FIGS. 1 and 2.
Figure 4:
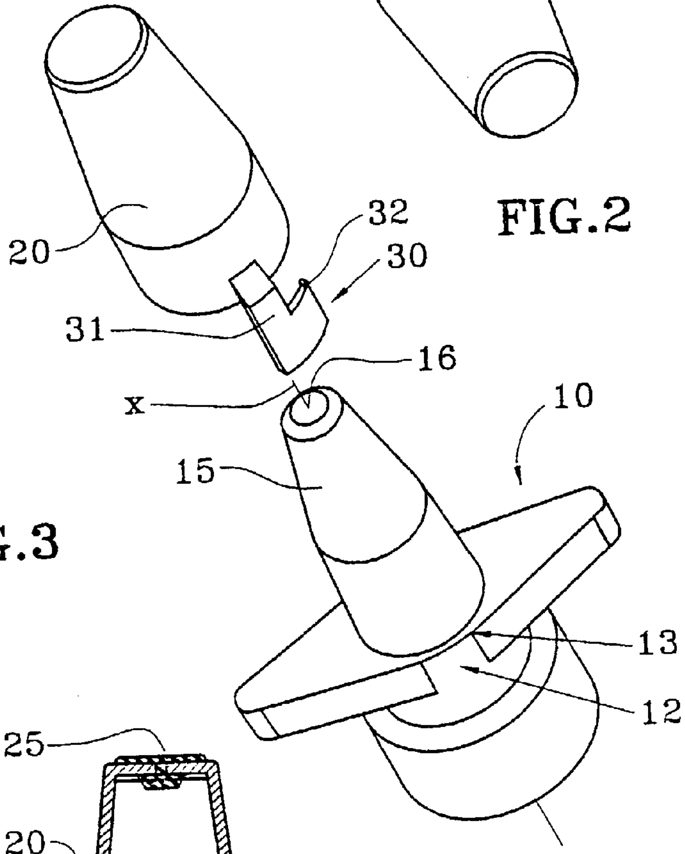
FIG. 4 is a diagrammatic perspective view showing the cap of FIGS. 1 to 3, and the fluid dispenser device on which said cap is fitted.
Figure 5:
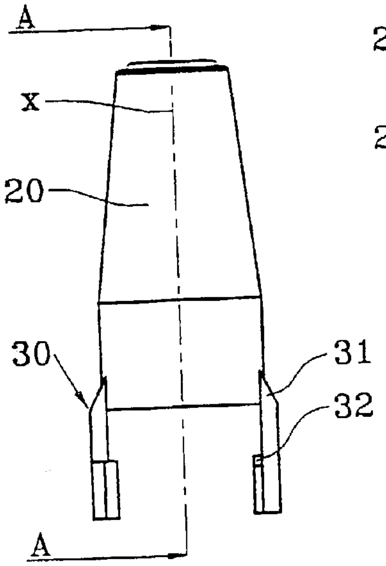
FIG. 5 is a section view of the safety cap of the invention.
Figure 6:
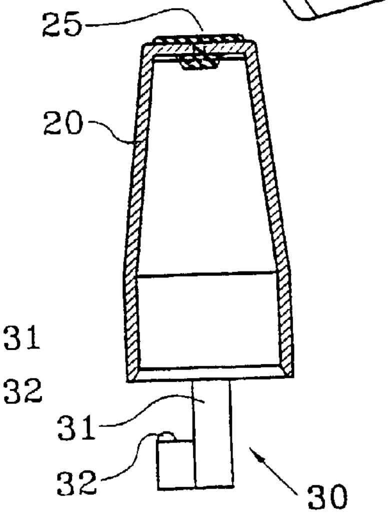
FIG. 6 is a section view on line A—A of FIG. 5.

In the invention, the safety cap 20 serves to be fitted to a fluid dispenser 10 preferably including a dispensing head 15 provided with a dispensing orifice 16. The cap 20 is provided with fixing means 30 which include one or more, and in particular two, side tabs 31, each tab being terminated by a U-shaped end 32. The safety cap 20 also preferably includes elastically deformable means 25 that are advantageously in the form of a deformable resilient element 25 preferably disposed in the end of the cap, i.e. at the front end wall of said cap 20, as shown in FIG. 6. This resilient element 25, made of a deformable resilient material, such as, for example, Santoprene, is adapted to be compressed when the cap is put in place on the dispensing head 15. The compression is achieved by axially pressing the cap 20 against said dispensing head 15 along the axis X shown in FIGS. 4 and 5.

Advantageously, as shown in FIG. 6, the resilient element 25 extends both over the inside face of the cap, to perform the compression function, and over the outside face of the cap, to facilitate handling and/or to indicate the zone on which to press. Such a flexible material makes it possible for the cap to be gripped firmly in the hand, e.g. by providing a piece of relief, and it can easily be colored to distinguish a particular zone of the cap.

The fluid dispenser device 10 includes a fixing portion co-operating with the fixing means for fixing the cap. In the invention, the fixing means include an axial slot 12 defined by at least one vertically-extending side wall 13. As shown diagrammatically in FIG. 4, this slot 12 is designed to pass a respective one of said fixing tabs on the cap, and in particular to pass its U-shaped end 32. The side wall 13 is organized such that it is possible to turn the cap 20 on the dispensing head only once said resilient element 25 situated in the end of said cap, as shown in FIG. 6, has been compressed. When said axial pressure is exerted on the cap, and when the resilient element 25 is deformed, the U-shaped end 32 of the tab 31 passes right through the slot 12, under the side wall 13, so that the cap can be turned about the axis X. After the cap has been turned, the deformed resilient element 25 urges the cap 20 away from the dispensing head 15 so that the side wall 13 is urged between the branches of the U-shaped end 32, thereby fixing the cap to the dispensing head.

To remove the safety cap, it is necessary, in the invention, firstly to exert axial pressure on said cap 20 to compress the resilient element 25, and thus to cause the side walls 13 to come out of the U-shaped ends 32 of the fixing tabs 31 on the cap. After this axial compression along the axis X, the cap 20 can be turned about the axis X to bring the U-shaped end 32 of the respective one of the tabs 31 in register with the axial slot 12. The cap can then be removed easily by pulling axially on it.

The present invention thus provides a system that is very simple to manufacture and thus very inexpensive, which makes it possible to guarantee protection against accidental use by children, by requiring two handling operations to remove the cap, namely applying axial pressure to it followed by turning it about said axis.

The safety cap of the invention can be fitted very easily to existing dispensers since it is necessary merely to provide said axial slot in the in dispensing head of an existing device in order to enable said cap to be put in place.

The present invention is described with reference to a particular embodiment of it, but clearly various modifications are possible without going beyond the ambit of the present invention as defined by the accompanying claims.

What is claimed is:

1. A fluid dispenser device (10) comprising a fluid reservoir, a dispensing member, a dispensing head (15) provided with a dispensing orifice (16) and with a fixing portion (12, 13), and a safety cap (20) provided with fixing means (30) for fixing said cap (20) to said dispenser device (10), said fixing means (30) being removable in order to take off said cap (20) before said dispenser device (10) is used, said fixing means (30) being removed by a combination of axial pressure on said cap (30) along an axis (X) of said device and turning said cap (20) about said axis (X), said fluid dispenser device being characterized in that said cap (20) is provided with fixing tabs (31), each of the fixing tabs having a U-shaped end (32), and said fixing portion (12, 13) is provided with a respective axial slot (12) for said U-shaped end (32) of each of the fixing tabs (31), said axial slot (12) being defined by a respective side wall (13) that comes into position between the branches of said U-shaped end (32), after said cap (20) has been turned.

2. A device according to claim 1, in which said cap (20) is provided with elastically-deformable means (25) which co-operate with the dispenser device (10) to prevent any turning of said cap (20) in the absence of said axial pressure.

3. A device according to claim 2, in which said cap (20) is turned only when said elastically-deformable means (25) are compressed.

4. A device according to claim 2, in which said elastically-deformable means (25) comprise a resilient element (25) made of a deformable flexible material disposed inside said cap (20).

5. A device according to claim 2, in which said elastically-deformable means comprise a resilient element (25) made of a deformable flexible material disposed on an end wall of the cap, and extending over the inside face and over the outside face of said end wall of the cap.

6. A device according to claim 2, in which said elastically-deformable means (25) are compressed to enable said U-shaped end (32) of each of the fixing tabs (31) to pass axially through the respective slot (12) beyond said side wall (13), so that, after said cap (20) has been turned, said elastically-deformed means (25) urge said cap (20) axially away from the dispensing head (15) so that said side wall (13) is forced elastically between said branches of the U-shaped end (32) to fix the cap (20) onto the head (15).

7. The device according to claim 1, wherein the dispensing member is a pump.

8. The device according to claim 4, wherein the deformable flexible material is Santoprene.

9. The device according to claim 5, wherein the deformable flexible material is Santoprene.

10. The device according to claim 1, wherein the respective side wall comes into position between the branches of the U-shaped end when axial pressure is first applied to the cap followed by the turning of the cap.

11. The device according to claim 1, wherein the cap is secured to the dispensing device and the respective side wall is disposed between the branches of the U-shaped end of a corresponding one of the fixing tab.

12. The device according to claim 1, wherein each of the fixing tabs extends along one branch of the U-shaped end beyond a base of the cap.

13. A fluid dispenser device, comprising:

a fluid reservoir;

a dispensing member;

a dispensing head comprising a dispensing orifice with a fixing portion, the fixing portion comprising of the axial slots, each axial slot having a corresponding side wall; and a safety cap comprising fixing tabs, each of the fixing tabs having a U-shaped end and configured to be received in a respective one of the axial slots; and wherein the safety cap locks with the dispensing head so that the safety cap is removable from the dispensing head when the safety cap is axially moved in the direct of the fluid reservoir and rotated; and wherein, for each of the U-shaped end, the corresponding side wall comes into position between branches of the U-shaped end when axial pressure is first applied to the safety cap followed by the turning of the safety cap.

14. The fluid dispenser device of claim 13, wherein, when the safety cap locks with the dispensing head, the side wall of each of the axial slots is disposed between branches of the U-shaped end.

15. The fluid dispenser device of claim 13, wherein the cap comprises an elastically-deformable member that resists axial movement of the cap in the direction of the reservoir prior to unlocking the cap from the dispensing head.

16. The fluid dispenser device of claim 15, wherein elastically-deformable member is disposed on an inside end wall of the cap.

17. The fluid dispenser device of claim 13, wherein, when the safety cap locks with the dispensing head, the side wall of each of the axial slots is disposed between branches of the U-shaped end without deforming the U-shaped end.

18. The fluid dispenser device of claim 13, wherein, for each U-Shaped end, the corresponding side wall is between the branches of the U-shaped end of a respective one of the fixing tabs.

19. The fluid dispenser device of claim 13, wherein each of the fixing tabs extends along one branch of the U-shaped end beyond a base of the safety cap.

* * * * *